UNITED STATES PATENT OFFICE.

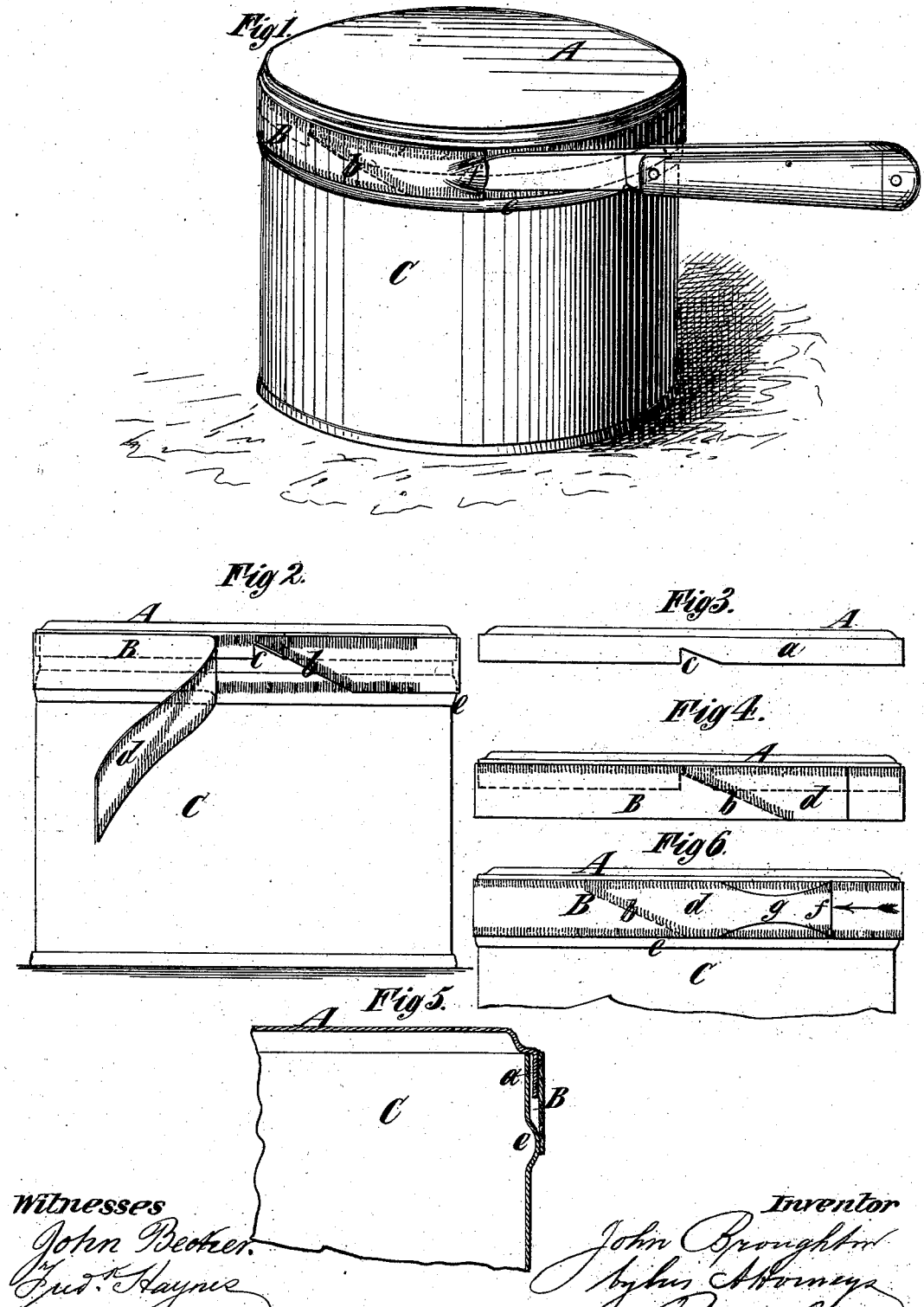

JOHN BROUGHTON, OF BROOKLYN, NEW YORK.

HERMETICALLY-SEALED METALLIC CAN.

SPECIFICATION forming part of Letters Patent No. 228,031, dated May 25, 1880.

Application filed December 31, 1879.

*To all whom it may concern:*

Be it known that I, JOHN BROUGHTON, of Brooklyn, in the county of Kings and State of New York, have invented certain new and useful Improvements in Hermetically-Sealed Metal Cans, of which the following is a specification.

This invention relates to sheet-metal cans for holding paints and other substances, in which the mouth of the can is closed by a rim or flanged cover and is hermetically sealed by a strip of thin tin soldered along the edges to the cover and the body of the can respectively, and capable of being ripped off when it is desired to loosen the cover for opening the can. In the closing of such cans the strip has not only to be soldered along its two opposite longitudinal edges to the cover and body of the can, but also crosswise at the lap formed near the opening end of the strip. The strip should be sufficiently wide to prevent the solder at its opposite edges from running across the entire width of its inner surface, and so soldering the cover to the body of the can, and at the same time should not be made so wide that the cross-soldering at its end will form an obstacle in removing the strip from the can.

In Letters Patent No. 218,481, granted to me August 12, 1879, I overcome this difficulty by narrowing the strip near its outer end, so that the solder applied at its two opposite edges will meet at the center of the strip.

The object of my present invention is to provide another method of forming the cross seam or joint; and to this end I produce the said joint by soldering across outside the end of the underlap and against the inside of the overlap from the inside thereof after the latter has been soldered to the cover of the can, but before the cover has been applied to the can.

To enable the cross-joint thus made to be easily ripped apart for opening the can, I prefer to cut the end of the strip slanting or raking, and to facilitate the soldering of the cross-seam I provide on the rim of the cover a notch at the point where the inner end of the strip is joined to it.

It is also very desirable that the free end of the strip should be soldered down at its two edges, to prevent it from being accidentally torn, and at the same time to form a pocket at the end of the strip for the insertion of an opening-tool.

To solder the overlapping portions of the strip together and to the body of the can by one passage of the soldering-iron over them, it would be necessary to pass slowly over the strip, and unless great care were used the solder would be so melted and run in across the strip, or the tinning of the plate would be so sweated, that the body would be liable to be soldered or sweated to the cover.

To obviate this difficulty is the object of another feature of my invention; and to this end I narrow the sealing-strip between its outer partly free or pocketed end and the point where it overlaps the inner end, so that by passing the iron along each edge in soldering the free end is soldered at each side or corner to form the pocket, while the narrow portion of the strip is skipped by the iron, and is not soldered to the under portion thereof.

In the accompanying drawings, Figure 1 represents a perspective view of a closed sheet-metal can having my invention applied thereto. Fig. 2 represents a side view of such a can with the strip partly torn away. Fig. 3 represents a side view of the cover before the strip is applied thereto. Fig 4 represents a side view of the cover and strip applied thereto. Fig. 5 represents a vertical section through a portion of the can and cover; and Fig. 6 represents a side view of the upper portion of a can-body having a cover and a strip of slightly-modified form.

Similar letters of reference designate corresponding parts in all the figures.

A designates a cover of the ordinary form, provided with a downwardly-extending rim, $a$, to which the sealing-strip B may be united. C designates the body of the can, which may be like those ordinarily used.

In closing the can the strip B is to be first soldered to the rim $a$ of the cover. This I prefer to do before putting the cover on the can by applying the solder on the outside of the strip on its upper edge. The next operation is to solder the outside end of the underlap $b$ to the inside of the overlap $d$ of the strip, and this must be done on the inside of the cover before the latter is put on the can. This joint is shown in Figs. 1, 4, and 6 in dotted outline, and the inner end of the strip is shown in Fig. 2, being represented in all the figures as cut slanting or raking, in order to prevent too great resistance to the breaking of the joint in tearing off the strip to open the can.

In order to permit the point of the soldering-iron to be run upon the inside of the strip in soldering the inner end to the outer lapping portion of the strip, I cut in the lower edge of the rim $a$ a notch, $c$, corresponding in shape to the raking or slanting end of the underlap $b$. This notch enables the solder to be run up to join the longitudinal line of solder at the upper side of the strip. The strip has its overlapping portion $d$ soldered down upon the inner portion along the upper edge, and then the cover is ready to be applied to the can. The strip is soldered along its lower edge to the bead $e$ upon the can-body, and thereby hermetically seals the can.

It is desirable that an open pocket, $f$, be left at the outer end of the strip for the insertion of a knife-point or other tool, as clearly shown in Fig. 1. The soldering-iron must be passed very slowly along the under edge of the outer overlapping portion of the strip, to solder it to the inner portion and the inner portion to the body of the can, and unless care is used by the workman the solder will run in and across under the strip, uniting the cover-rim to the body. To obviate this difficulty, and enable the workman to perform the work of closing more quickly, I narrow the sealing-strip between its outer end and the point where it is joined to the raking or slanting inner end. This is clearly represented in Fig. 6, where $g$ represents the narrowed portion, the edges of which are not soldered, as the iron is passed straight along the edge of the strip across the narrowed portion. The end of the strip is soldered down at each corner so as to form a pocket, and at the same time secure the loose end of the strip.

In tearing off the strip the line of solder along its inner raking or slanting end offers little resistance to the removal of the strip.

What I claim as my invention, and desire to secure by Letters Patent, is—

1. The combination, with a can-cover, of a sealing-strip affixed thereto and having the cross-joint at its lap secured by solder along the end of the underlap and against the inside of the overlap, substantially as specified.

2. The combination, with a can-cover having a notch, $c$, in the rim thereof, of a sealing-strip affixed thereto, and having the cross-joint at its lap opposite said notch, and secured by solder along the end of the underlap and against the inside of the overlap, substantially as specified.

3. The combination, with the cover and body of a can, of a sealing-strip soldered along both its edges to the can body and cover, and having the cross-joint of the lap of the strip secured by solder along the end of the underlap and against the inside of the overlap, and having a pocket at the end of said overlap, substantially as specified.

4. The combination, with the cover and body of a can, of a sealing-strip soldered along both its edges to the can body and cover, and cross-soldered along the end of the underlap and against the inside of the overlap, and having beyond said cross-soldering an extension of the overlap, which is soldered to the can body and cover at the corners of the ends, and which is narrowed and left unsoldered between said cross-soldering and the ends, substantially as specified.

5. The strip B, having a slanting or raking inner end and soldered to the lapping portion of the strip along the end of the underlap and against the inside of the overlap, in combination with the cover, substantially as specified.

JOHN BROUGHTON.

Witnesses:
HENRY T. BROWN,
FREDK. HAYNES.